United States Patent [19]
Merten et al.

[11] Patent Number: 5,658,085
[45] Date of Patent: Aug. 19, 1997

[54] TOGGLE SECURING DEVICE FOR TOGGLE JOINTS IN CHAIN CONVEYORS AND THE LIKE

[75] Inventors: Gerhard Merten, Lünen; Reinhold Brüggemann, Dortmund; Siegfried Schmidt, Bottrop, all of Germany

[73] Assignee: DBT Deutsche Bergbau-Technik GmbH, Germany

[21] Appl. No.: 595,216

[22] Filed: Feb. 1, 1996

[30] Foreign Application Priority Data

Feb. 22, 1995 [DE] Germany ............... 295 02 953.6

[51] Int. Cl.⁶ ............... B65G 19/28; E21F 13/08
[52] U.S. Cl. ............... 403/315; 403/294
[58] Field of Search ............... 198/735.2, 735.6, 198/860.2, 861.2, 861.1; 403/315, 292, 294

[56] References Cited

U.S. PATENT DOCUMENTS

| | | | |
|---|---|---|---|
| 4,420,075 | 12/1983 | Skolik et al. | 403/294 X |
| 4,479,575 | 10/1984 | Grundken et al. | 198/861.2 X |
| 4,733,771 | 3/1988 | Grundken et al. | 198/735.6 |
| 5,287,955 | 2/1994 | Steinkuhl et al. | 198/735.6 |

FOREIGN PATENT DOCUMENTS

| | | |
|---|---|---|
| 3628207 | 2/1988 | Germany . |
| 4128512 | 3/1993 | Germany . |

*Primary Examiner*—Anthony Knight
*Attorney, Agent, or Firm*—Vickers, Daniels & Young

[57] ABSTRACT

Toggle securing device for toggle joints of conveyor pans for chain conveyors, guide pans of winning machinery guides and the like with a securing plate which secures the toggle in its receiving pocket, laterally overlaps it at the end, can be introduced from the side into a respective insertion pocket by its two ends and can be caught in one of the two superimposed insertion pockets by a plastic pin which passes through a receiving hole in one end region of the securing plate and penetrates a locking orifice in the associated insertion pocket. In order to provide a securing plate for toggle joints, which can be used for toggle joints of known designs, either using a fixing sleeve or using a plastic pin as a securing element, the securing plate has a drive-in hole for a fixing sleeve at its other end region and is designed in such a way that it can be caught on the locking orifice of the insertion pocket either by means of the plastic pin or by means of the fixing sleeve after being rotated through 180°.

33 Claims, 1 Drawing Sheet

TOGGLE SECURING DEVICE FOR TOGGLE JOINTS IN CHAIN CONVEYORS AND THE LIKE

The invention relates to a toggle securing device for toggle joints of conveyor pans, and more particularly for toggle joints of conveyor pans for chain conveyors, guide pans of winning machinery guides and the like with a securing plate which secures the toggle in its receiving pocket, laterally overlaps it at the end, can be introduced into a respective insertion pocket by its two ends and can be caught in one of the two superimposed insertion pockets by means of a plastic pin which passes through a receiving hole in one end region of the securing plate and penetrates a locking orifice in the associated insertion pocket.

BACKGROUND OF THE INVENTION

A toggle securing device of this type is known from U.S. Pat. No. 5,287,955 to Steinkuhl et al., in which a plastic pin which rests in a receiving hole in the securing plate and engages with its ends laterally projecting from the receiving hole in locking recesses in the insertion pocket, is used to secure the securing plate inserted in the insertion pockets. The securing plate has at its other (lower) end, a cam-like attachment which engages in a base recess on the bottom of the lower insertion pocket, so the securing plate is locked on this insertion pocket. The securing plate also has, in the region located between the insertion pockets, an ejection bore forming a dismantling orifice into which a spindle-like tool can be inserted from the exterior to release the securing plate in order to lift the securing plate from its seat in the insertion pockets.

A toggle joint is also known from U.S. Pat. No. 4,733,771 to Grüdken, et al., in which a simple fixing sleeve which is driven from the exterior into aligned bores on the wall projection of the upper insertion pocket and the securing plate therebehind is used to secure the securing plate overlapping the end of the toggle bolt. The device is arranged in such a way that a space for the penetration of the fixing sleeve is provided behind the wall projection of the upper insertion pocket in order to release the securing plate.

For toggle securing devices in previously known toggle joint, separate securing plates have to be used and kept in reserve in practice, namely securing plates which are caught by a fixing sleeve on the one hand and securing plates which are fixed by a plastic pin on the other hand.

SUMMARY OF THE INVENTION

An object of the invention is to provide a securing plate for toggle joints which can be used for the aforementioned toggle joints of known designs, either using a fixing sleeve or using a plastic pin or the like as securing element.

On the basis of the toggle securing device of the type mentioned at the outset, the aforementioned object is achieved according to the invention in that the securing plate has a drive-in hole for a fixing sleeve at its other end region and is designed in such a way that it can be caught on the locking orifice of the insertion pocket either by means of the plastic pin or by means of the fixing sleeve after being rotated through 180°.

According to the invention, the securing plate used for the toggle securing device has, at its two end regions, a respective hole for a pin element, one hole forming the receiving hole for a flexible plastic pin and the other hole the drive-in hole for a fixing sleeve. The securing plate with the aforementioned holes is designed in such a way that it can be used, after a mere rotation through 180°, either in the known toggle joints with plastic pin catching or in the also known toggle joints with fixing sleeve catching, so uniform securing plates can be used for all these toggle joints. The drive-in hole for the fixing sleeve preferably has a smaller diameter than the receiving hole for the plastic pin.

In a further embodiment of the invention, the locking orifice arranged in the insertion pocket for the penetration of the plastic pin or the fixing sleeve is designed as a locking recess which is open at the edge and of which the open side faces the other insertion pocket. This locking orifice is preferably located on the upper insertion pocket. The securing plate is expediently convexly rounded, preferably substantially semi-circularly, at its two ends while the pocket bottom of the lower insertion pocket is correspondingly trough-shaped in design therefore forms a pivot bearing for the lower end of the securing plate. It is also advisable to arrange a dismantling orifice on the securing plate-between the receiving hole for the plastic pin and the drive-in hole for the fixing sleeve, the dismantling orifice being exposed for insertion of a simple spindle-like tool when the securing plate is inserted in the insertion pockets and allowing the securing plate to be removed laterally from its mounting in the insertion pockets, as known.

In summary, the toggle securing device for toggle joints of conveyor pans for chain conveyors, guide pans of winning machinery guides and the like includes a securing plate which secures the toggle in its receiving pocket and laterally overlaps it at the end. The securing device can be introduced from the side into a respective insertion pocket by its two ends and can be caught in one of the two superimposed insertion pockets by means of a plastic pin which passes through a receiving hole in one end region of the securing plate and penetrates a locking orifice in the associate insertion pocket. The securing plate has a drive-in hole for a fixing sleeve at its other end region and is designed in such a way that it can be caught on the locking orifice of the insertion pocket either by means of the plastic pin or by means of the fixing sleeve after being rotated through 180°. The locking orifice arranged on the insertion pocket for engagement of the plastic pin or the fixing sleeve is preferably designed as a locking recess which is open at the edge. The securing plate preferably has a dismantling orifice between the receiving hole for the plastic pin and the drive-in hole for the fixing sleeve. The securing plate is preferably convexly rounded, preferably substantially semicircularly, at its two ends, while the pocket bottom of the lower insertion pocket is correspondingly trough-shaped in design. The drive-in for the fixing sleeves preferably has a smaller diameter than the receiving hole for the plastic pin. The upper insertion pocket preferably has a rounded sliding face for the flexible plastic pin to the side of its downwardly open locking orifice.

BRIEF DESCRIPTION OF THE DRAWINGS

Reference may now be made to the drawings, which illustrate various embodiments that the invention may take in physical form and in certain parts and arrangement of parts wherein.

DETAILED DESCRIPTION OF THE PREFERRED EMBODIMENTS

Figure 1:
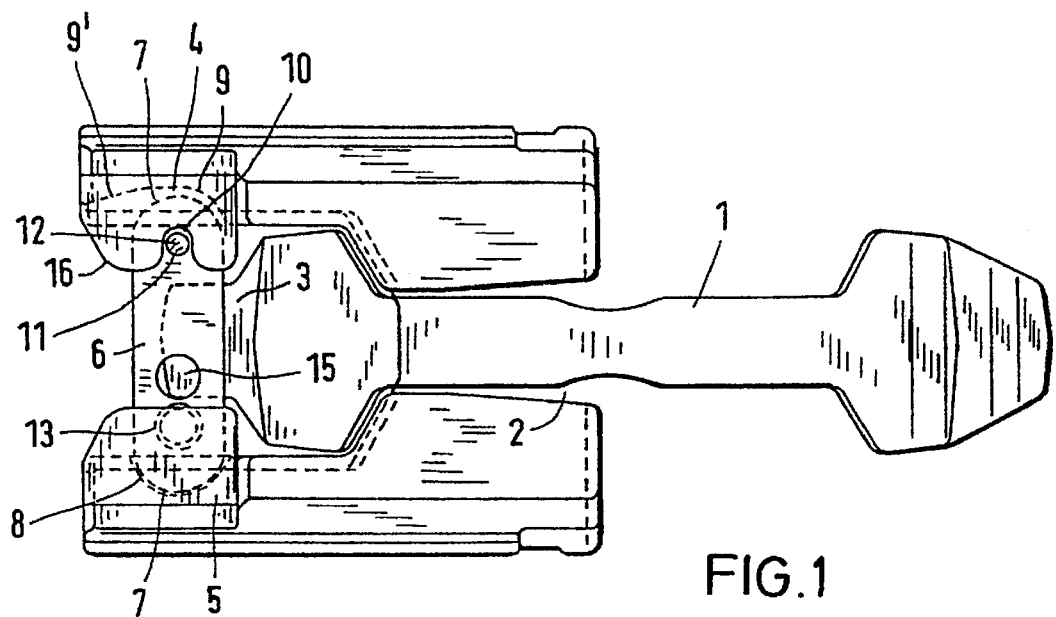
FIG. 1 shows a toggle securing device according to the invention in a side view of the toggle bolt and the securing plate which secures it in the receiving pocket and is secured in its position here by a fixing sleeve.

Referring now to the drawings, wherein the showings are for the purpose of illustrating the preferred embodiments of the invention only and not for the purposes of limiting the same, and further reference is made to the disclosure of DE-OS 36 28 207 and DE-OS 41 28 512 which will become the content of the present description of the invention.

As toggle joints are known from the aforementioned state of the art, known toggle joints with their toggle receiving pocket are shown in the drawings only on the side where the toggle securing device according to the invention is located.

The toggle bolt 1 has the design described in the aforementioned documents. It is inserted in the receiving pockets which are arranged on the conveyor pan ends externally on the lateral profiles of the conveyor pans to be connected and of which the receiving pocket 2 at one conveyor pan end is shown. As known, the toggle bolt 1 here has an axial peg extension 3 which serves to secure the toggle bolt 1 against release and against a lateral fall from the receiving pocket 2. As known, insertion pockets 4 and 5 for receiving a narrow securing plate 6 which is convexly rounded substantially semi-circularly at its upper lower end at 7 are provided above and below the peg extension 3 on the component of the toggle joint forming the receiving pocket 2. The pocket bottom 8 of the lower insertion pocket is correspondingly trough-shaped so the securing plate 6 rests with its rounded foot 7 pivotally in the pocket bottom 8. The upper insertion pocket 4 is slightly rounded at its pocket bottom 9, this rounded face issuing as an obliquely downwardly inclined slide-in face 9' to the exposed side of the insertion pocket 4 from which the securing plate 6 is introduced into the insertion pockets 4 and 5. Consequently, the securing plate 6 can be introduced by its lower end into the lower insertion pocket 5 from this side and while being pivotally supported in the pocket bottom 8 can then be pivoted by its upper end into the upper pocket 4 from the side into the illustrated securing position in which it covers the peg 3 of the toggle bolt 1 and therefore prevents the toggle bolt in the toggle joint from falling out.

The upper insertion pocket has, on its wall part covering the inserted securing plate 6, a locking orifice 10 which is designed as a locking recess with a trough-shaped bottom which is open to the edge, i.e. is open toward the lower insertion pocket 5. The securing plate 6 has a hole in one end region which forms a drive-in hole 11 for a fixing sleeve 12. At its other end region, the locking plate 6 has a hole which has a greater diameter than the drive-in hole 11 and forms a receiving hole 13 for a plastic pin 14. Between the holes 11 and 13 in the vicinity of the receiving hole 13 the securing plate 6 has a further hole which forms a dismantling orifice 15.

FIG. 1 shows the securing plate 6 in an installation position in which its drive-in hole 11 is located at the top in the locking orifice while its receiving hole 13 is located in the lower insertion pocket 5. To fix the securing plate 6 in the illustrated securing position, the fixing sleeve 12 is driven into the upper drive-in hole 11 from the exterior while the receiving hole 13 remains unused, that is does not receive a plastic pin. The securing plate 6 is caught in the illustrated position by the fixing sleeve 11. In order to remove the securing plate to release the toggle bolt 1, the fixing sleeve 12 can be removed outwardly from the drive-in hole 11 and the locking orifice 10. Instead, the device can also be arranged, as known, in such a way that, for releasing the catch, the fixing sleeve 12 can be driven from the exterior to the interior of the insertion pocket 4 and out of the drive-in hole 11 so the securing plate 6 according to FIG. 1 can be pivoted to the left from the two insertion pockets 4 and 5, optionally using the dismantling orifice 15.

Figure 2:
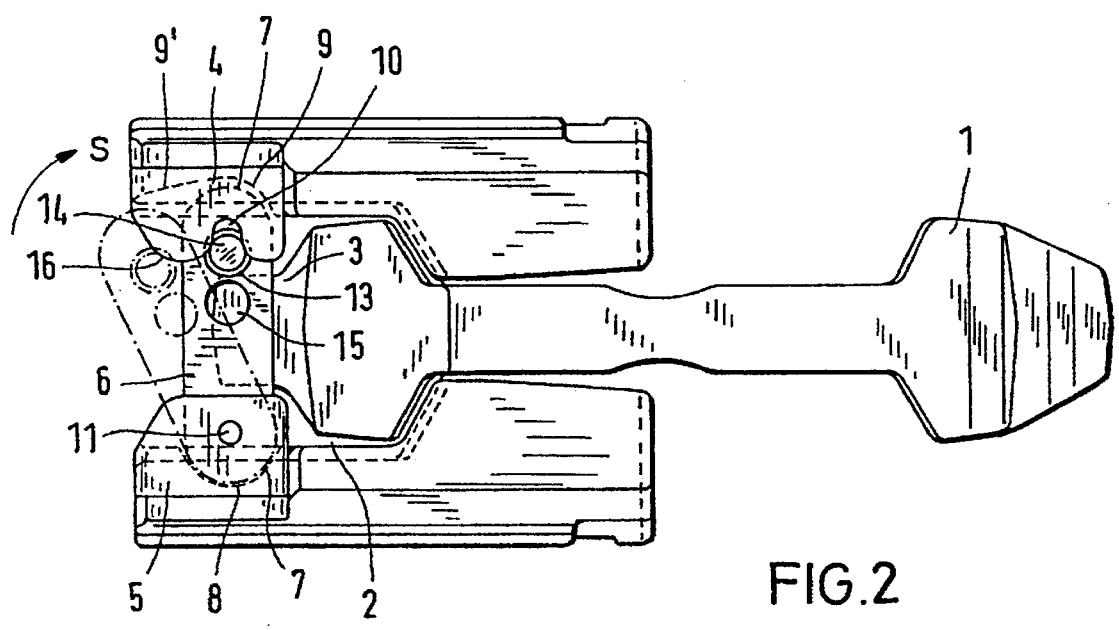
FIG. 2 shows a different known toggle joint, the securing plate shown in FIG. 1, rotated through 180°, being used as securing element and being caught by a plastic pin.

FIG. 2 shows the same securing plate 6 after a rotation through 180°, the securing plate 6 being caught on the upper insertion pocket 4 by means of the plastic pin 14. In this case, the securing plate 6 with its lower end comprising the drive-in hole 11 rests pivotally in the trough-shaped pocket bottom 8 of the lower insertion pocket but, as indicated in dot-dash lines in FIG. 2, it can be pivoted in the direction of the arrow S with its upper end into the upper insertion pocket 4 while resting in the pocket bottom 8. In this case, the receiving hole 13 passes into the overlap region of the locking orifice 10 of the upper insertion pocket so the plastic pin 14 which is inserted into the receiving hole 13 and projects with its ends laterally from the receiving hole 13 is jammed with elastic deformation in the locking orifice 10 which is open at the edge. The device is expediently arranged in such a way that the plastic pin 14 is provided prior to insertion of the securing plate 6 into the insertion pockets 4 and 5 with the plastic pin 14. As the securing plate 6 is pivoted in the direction of the arrow S, the resilient plastic pin 14 slides over the rounded sliding face 16 shown in FIG. 2 until it finally engages in the locking orifice, as shown in FIG. 2. The securing plate 6 is reliably caught in the insertion pockets in this position.

To release the toggle securing device according to FIG. 2, a spindle-like tool can be inserted from the exterior into the dismantling orifice 15, with which tool the securing plate 6 can then be lifted from the upper insertion pocket 4 to the side against the direction of the arrow S, whereupon the pivoted out securing plate 6 can be pulled from the lower insertion pocket 5.

It can be seen from the foregoing that the illustrated securing plate 6 can be used both in toggle joints with a fixing sleeve securing device and in toggle joints with a plastic pin securing device, the securing plate 6 merely being introduced into the insertion pockets 4 and 5 in one insertion position or in the other insertion position rotated through 180°.

The invention has been described with reference to a preferred embodiment and alternatives thereof. It is believed that many modifications and alterations to the embodiment disclosed will readily suggest themselves to those skilled in the art upon reading and understanding the detailed description of the invention. It is intended to include all such modifications and alterations insofar as they come within the scope of the present invention.

We claim:

1. A locking arrangement for securing a toggle bolt in a toggle joint of a conveyor pan, said toggle joint including receiving pocket means for receiving said toggle bolt, insertion pocket means for receiving securing plate means, and plate connection means for connecting said securing plate means in said insertion pocket means, said securing plate means including a securing plate adapted to be secured in said insertion pocket means for at least partially overlapping said toggle bolt to secure said toggle bolt in said receiving pocket means, said insertion pocket means including a top pocket which receives a first end of said securing plate and includes a locking orifice and a bottom pocket which receives a second end of said securing plate, said ends of said securing plate having generally identical shapes for insertion into either said top pocket or said bottom pocket, said securing plate including a first pin hole in said first end of said securing plate and a second pin hole in said second end of said securing plate, said plate connection means including a locking pin to be secured in one of said first or second pin holes in the end of said securing plate which is positioned in said top pocket when said securing plate means is positioned in said insertion pocket means, said locking pin enagaging said locking orifice of said top pocket.

2. A locking arrangement as defined in claim 1, wherein said first pin hole in said first end has a smaller diameter than said second pin hole in said second end.

3. A locking arrangement as defined in claim 2, wherein said diameter of said first pin hole is less than or equal to the diameter of said locking orifice.

4. A locking arrangement as defined in claim 3, wherein said diameter of said second pin hole is greater than the diameter of said locking orifice.

5. A locking arrangement as defined in claim 4, wherein said first and second pin holes are spaced inwardly from said first and second ends of said securing plate respectively, said second pin hole spaced farther from said second end than said first pin hole spaced from said first end.

6. A locking arrangement as defined in claim 1, wherein said diameter of said first pin hole is less than or equal to the diameter of said locking orifice.

7. A locking arrangement as defined in claim 1, wherein said diameter of said second pin hole is greater than the diameter of said locking orifice.

8. A locking arrangement as defined in claim 1, wherein said first and second pin holes are spaced inwardly from said first and second ends of said securing plate respectively, said second pin hole spaced farther from said second end than said first pin hole spaced from said first end.

9. A locking arrangement as defined in claim 1, wherein said receiving pocket means includes a lateral opening for receiving said toggle bolt and said securing plate means securing said toggle bolt in said lateral opening.

10. A locking arrangement as defined in claim 1, wherein said first end and said second end of said securing plate means are arcuate shaped.

11. A locking arrangement as defined in claim 10, wherein said first end and said second end of said securing plate means are substantially semi-circularly shaped.

12. A locking arrangement as defined in claim 10, wherein said bottom pocket including an arcuate shaped surface designed to receive said first or said second end of said securing plate.

13. A locking arrangement as defined in claim 12, wherein said first or said second end of said securing plate positioned in said bottom pocket for pivotable movement.

14. A locking arrangement as defined in claim 13, wherein said top pocket including an arcuate shaped surface designed to receive said first or said second end of said securing plate.

15. A locking arrangement as defined in claim 14, wherein said arcuate shaped surface of said top pocket includes an obliquely inclined surface of receiving said first or said second end of said securing plate as the other end of said securing plate pivots in said bottom pocket.

16. A locking arrangement as defined in claim 15, wherein said locking orifice includes a locking recess, said locking recess having an opening at the bottom edge of said top pocket.

17. A locking arrangement as defined in claim 16, wherein said locking pin includes a flexible material which deforms in shape upon engagement with said locking recess.

18. A locking arrangement as defined in claim 17, wherein said securing plate means is secured in said insertion pocket means by said plate connecting means when said locking pin is at least partially inserted in said locking recess.

19. A locking mechanism as defined in claim 17, wherein said locking pin deforms upon engagement with said bottom edge of said top pocket as said locking pin is moved toward said locking recess.

20. A locking mechanism as defined in claim 19, wherein said locking pin is moved into said locking recess as said first or said second end of said securing plate pivots in said arcuate shaped surface of said bottom pocket.

21. A locking mechanism as defined in claim 20, wherein the bottom edge of said top pocket includes an arcuate sliding face which intersects with said open face of said locking recess.

22. A locking arrangement as defined in claim 1, wherein said securing plate means includes a dismantling orifice positioned between said first pin hole and said second pin hole of said securing plate.

23. A locking arrangement as defined in claim 1, wherein said top pocket including an arcuate shaped surface designed to receive said first or said second end of said securing plate.

24. A locking arrangement as defined in claim 1, wherein said locking orifice includes a locking recess, said locking recess having an opening at the bottom edge of said top pocket.

25. A locking arrangement as defined in claim 1, wherein said securing plate means is secured in said insertion pocket means by said plate connecting means when said locking pin is at least partially inserted in said locking recess.

26. A locking arrangement for securing a toggle bolt in a toggle joint of a conveyor pan, said toggle joint comprising a receiving pocket for receiving said toggle bolt, a top and a bottom insertion pocket, a plate connection and a securing plate, said securing plate secured in said insertion pockets and at least partially overlapping said toggle bolt to secure said toggle bolt in said receiving pocket, said top pocket receiving a first end of said securing plate and including a locking orifice, said bottom pocket receiving a second end of said securing plate, said ends of said securing plate having generally identical shapes for insertion into either said top pocket or said bottom pocket, said securing plate including a first pin hole in said first end of said securing plate and a second pin hole in said second end of said securing plate, said plate connection including a locking pin secured in one of said first or second pin holes in the end of said securing plate which is positioned in said top pocket when said securing plate is positioned in said insertion pockets, said locking pin engaging said locking orifice of said top pocket.

27. A locking arrangement as defined in claim 26, wherein said first pin hole in said first end has a smaller diameter than said second pin hole in said second end.

28. A locking arrangement as defined in claim 26, wherein said diameter of said second pin hole is greater than the diameter of said locking orifice.

29. A locking arrangement as defined in claim 26, wherein said securing plate includes a dismantling orifice positioned between said first pin hole and said second pin hole of said securing plate.

30. A locking arrangement as defined in claim 26, wherein said locking orifice includes a locking recess, said locking recess having an opening at a bottom edge of said top pocket, said locking pin including a flexible material which deforms in shape upon engagement with said locking recess.

31. A locking arrangement as defined in claim 30, wherein said locking pin deforms upon engagement with said bottom edge of said top pocket as said locking pin is moved toward said locking recess.

32. A locking arrangement as defined in claim 31, wherein said locking pin is moved into said locking recess as said first or said second end of said securing plate pivots in an arcuate shaped surface of said bottom pocket.

33. A locking mechanism as defined in claim 32, wherein the bottom edge of said top pocket includes an arcuate sliding face which intersects with said opening of said locking recess.

* * * * *